(12) United States Patent
Hun

(10) Patent No.: US 7,686,733 B2
(45) Date of Patent: Mar. 30, 2010

(54) MANUAL TRANSMISSION AND SHIFT LUG STRUCTURE THEREOF

(75) Inventor: Kim Myung Hun, Seoul (KR)

(73) Assignee: Hyundai Motor Company, Seoul (KR)

( * ) Notice: Subject to any disclaimer, the term of this patent is extended or adjusted under 35 U.S.C. 154(b) by 588 days.

(21) Appl. No.: 11/506,635

(22) Filed: Aug. 17, 2006

(65) Prior Publication Data
US 2007/0281823 A1 Dec. 6, 2007

(30) Foreign Application Priority Data
May 30, 2006 (KR) .................. 10-2006-0048794

(51) Int. Cl.
*F16H 3/44* (2006.01)
*F16H 3/38* (2006.01)
*F16D 11/06* (2006.01)
*B60W 10/02* (2006.01)

(52) U.S. Cl. .......................... 475/303; 74/339; 192/51; 192/3.52

(58) Field of Classification Search .................. 74/339, 74/404; 475/207, 218, 302, 303, 323; 192/51, 192/53.34, 3.52
See application file for complete search history.

(56) References Cited

U.S. PATENT DOCUMENTS

| | | | | |
|---|---|---|---|---|
| 1,463,638 A | * | 7/1923 | Thallmayer | 475/155 |
| 5,526,709 A | * | 6/1996 | Thomas et al. | 74/325 |
| 5,564,997 A | * | 10/1996 | Janson et al. | 475/207 |
| 5,593,358 A | * | 1/1997 | Frost | 475/218 |
| 6,213,909 B1 | * | 4/2001 | Raghavan | 475/282 |
| 6,669,596 B1 | * | 12/2003 | Sefcik | 475/278 |
| 6,719,655 B2 | * | 4/2004 | Kramer | 475/5 |

* cited by examiner

*Primary Examiner*—Roger Pang
(74) *Attorney, Agent, or Firm*—Edwards Angell Palmer & Dodge LLP; Peter F. Corless

(57) ABSTRACT

The present invention relates to a manual transmission and a shift lug structure thereof where a direct shifting from a first speed to a reverse speed can be is possible. In preferred aspects, a manual transmission of the invention may comprise: a transmission case; a main shaft; a hub coupled to an exterior circumference of the main shaft; a gear assembly disposed on one side of the hub and including a first speed clutch gear and a planetary gear set, the planetary gear set having a ring gear, a pinion gear, a sun gear, and a planetary carrier rotatably supporting the pinion gear; a synchronizer sleeve slidably connected to an exterior circumference of the hub and sliding in an axial direction of the main shaft, the synchronizer sleeve connecting the main shaft with the gear assembly; a synchronizer cone fixed to the first speed clutch gear; and a synchronizer ring applying a frictional force to the synchronizer cone and synchronizing the gear assembly with the main shaft in a shifting process, wherein the ring gear is coupled to the first speed clutch gear, the planetary carrier is fixed to the transmission case, and a reverse speed clutch gear is formed on an exterior circumference of the sun gear.

13 Claims, 8 Drawing Sheets in the neutral state    in the first shift speed    in the reverse shift speed

MANUAL TRANSMISSION AND SHIFT LUG STRUCTURE THEREOF

CROSS-REFERENCE TO RELATED APPLICATION

This application claims priority to and the benefit of Korean Patent Application No. 10-2006-0048794 filed in the Korean Intellectual Property Office on May 30, 2006, the entire contents of which are incorporated herein by reference.

BACKGROUND OF THE INVENTION (a) Field of the Invention

The present invention relates to a manual transmission and a shift lug structure thereof. In more particular aspects, the present invention relates to a manual transmission and a shift lug structure thereof where a direct shifting from a first speed to a reverse speed can be possible.

(b) Description of the Related Art

Nowadays, as performance of vehicles is improved, a transmission that generates more power has been developed. However, as a transmission generates more power, problems may occur such that a capacity of a synchronizer needs to be increased.

As shown in FIG. 8, a conventional manual transmission includes a main shaft 100, a hub 110, a gear assembly 120, and a synchronizer sleeve 170.

The main shaft 100 is connected to an engine and receives a power.

The hub 110 is coupled to an exterior circumference of the main shaft 100.

The gear assembly 120 includes a first speed clutch gear 130, a second speed clutch gear 140, synchronizer cones 150, and synchronizer rings 160. The first and second speed clutch gears 130 and 140 are disposed respectively on both sides of the hub 110. The synchronizer cones 150 are fixed to the first and second speed clutch gears 130 and 140. The synchronizer rings 160 apply a frictional force to the synchronizer cones 150 and synchronize the gear assembly 120 with the main shaft 100.

The synchronizer sleeve 170 is slidably connected to an exterior circumference of the hub 110, and connects the main shaft 100 with the gear assembly 120.

The shifting process according to the conventional manual transmission will hereinafter be described in detail, referring to FIG. 9.

When a driver controls a shift lever, a shift control lever and a select control lever of the transmission are operated by a shift cable. In this case, a shift fork fixedly connected to the synchronizer sleeve 170 moves the synchronizer sleeve 170 to the left or the right according to an operation of the shift control lever and the select control lever.

Therefore, in a neutral state, the synchronizer sleeve 170 moves and contacts with the synchronizer rings 160, and the synchronizer rings 160 apply the frictional force to the synchronizer cones 150 fixed to the first and second speed clutch gears 130 and 140 so as to rotate the synchronizer cones 150.

After that, the synchronizer sleeve 170 is engaged with the first speed clutch gear 130 or the second speed clutch gear 140, and synchronizes the main shaft 100 with the first speed clutch gear 130 or the second speed clutch gear 140.

According to the conventional manual transmission, an inertia moment of the transmission increases in proportion to a square radius thereof. However the capacity of the synchronizer increases in proportion to a radius thereof. Therefore, it can be difficult to increase the capacity of the synchronizer in proportion to an increase of the capacity of the transmission.

In addition, if the capacity of the synchronizer is low, a shift feel of the transmission may deteriorate, and a clash and a shift shock may occur.

Meanwhile, a sliding-type apparatus or a synchro-type apparatus for preventing a reverse noise is used so as to prevent the reverse noise in a process of shifting to the reverse shift speed. However, in this case, the transmission may be long.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention can provide in preferred aspects a manual transmission and a shift lug structure thereof having advantages of compactly designing the transmission to shorten a length of the transmission by an effective arrangement of a reverse speed clutch gear.

In addition, the present invention can provide in preferred aspects a manual transmission and a shift lug structure thereof that can have advantages of improving a shift feel and usage convenience by enabling direct shifting from the first shift speed to the reverse shift speed.

The present invention can further provide a manual transmission and a shift lug structure thereof having further advantages of simplifying components of the transmission and reducing production cost by using a first speed clutch gear as an apparatus for preventing a reverse noise.

An exemplary preferred manual transmission according to an embodiment of the present invention may include: a transmission case; a main shaft; a hub coupled to an exterior circumference of the main shaft; a gear assembly disposed on one side of the hub and including a first speed clutch gear and a planetary gear set, the planetary gear set having a ring gear, a pinion gear, a sun gear, and a planetary carrier rotatably supporting the pinion gear; a synchronizer sleeve slidably connected to an exterior circumference of the hub and sliding in an axial direction of the main shaft, the synchronizer sleeve connecting the main shaft with the gear assembly; a synchronizer cone fixed to the first speed clutch gear; and a synchronizer ring applying a frictional force to the synchronizer cone and synchronizing the gear assembly with the main shaft in a shifting process, wherein the ring gear is coupled to the first speed clutch gear, the planetary carrier is fixed to the transmission case, and a reverse speed clutch gear is formed on an exterior circumference of the sun gear.

The first speed clutch gear and the ring gear may be respectively elongated in an opposite direction to the hub and the elongated portions of the first speed clutch gear and the ring gear may be coupled to each other.

In addition, the first speed clutch gear may be splined to the ring gear.

The sun gear may be elongated toward the hub and the reverse speed clutch gear may be formed on an exterior circumference of the elongated portion of the sun gear.

A groove may be formed on an interior circumference of the synchronizer sleeve so that the first speed clutch gear is inserted into the groove and runs idle in a case that the synchronizer sleeve synchronizes the main shaft with the reverse speed clutch gear.

A gear may be formed on an exterior circumference of the ring gear and the ring gear may operate as an output member.

The reverse speed clutch gear may be disposed on an exterior circumference of the elongated portion of the first speed clutch gear.

The reverse speed clutch gear may be disposed between the first speed clutch gear and the ring gear.

Needle rollers may be interposed between the main shaft and the first speed clutch gear and between the first speed clutch gear and the reverse speed clutch gear.

An exemplary shift lug structure of a manual transmission according to an embodiment of the present invention may include: a 1-2 shift lug disposed on a 1-2 shift rail; a 3-4 shift lug disposed on a 3-4 shift rail; a 5-6 shift lug disposed on a 5-6 shift rail; and a reverse shift lug disposed on the 1-2 shift rail.

The reverse shift lug may be connected to the 1-2 shift lug.

The invention also includes engine systems and vehicles that comprise a manual transmission as disclosed herein.

It is understood that the term "vehicle" or other similar term as used herein is inclusive of motor vehicles in general such as passenger automobiles, buses, trucks, various commercial vehicles, watercraft, aircraft, and the like.

Other aspects of the invention are disclosed infra.

Figure 1A:
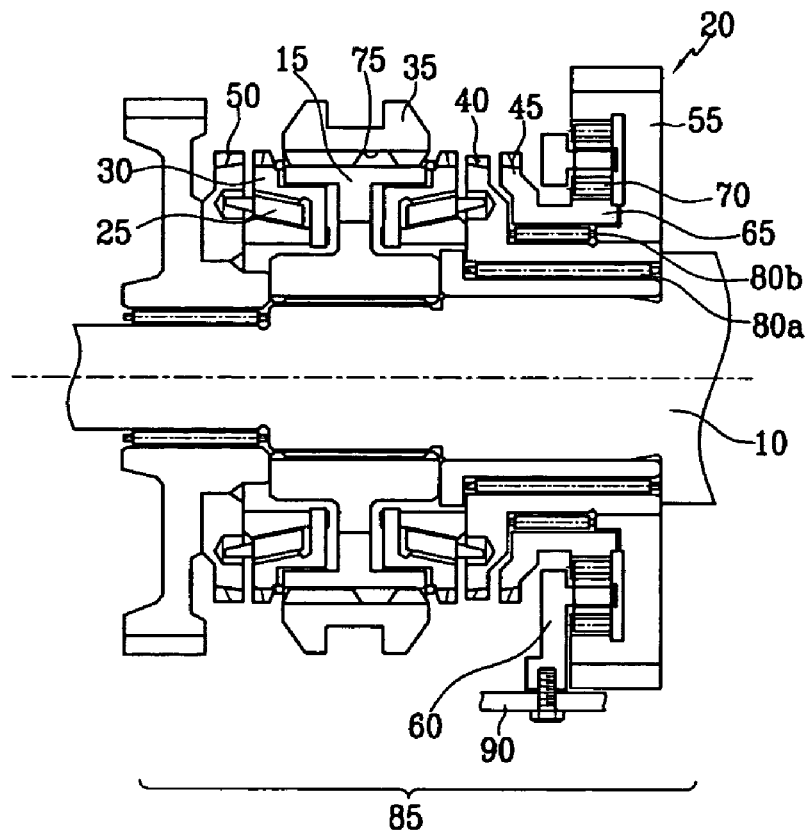
FIG. 1 is a cross-sectional view showing a part of a manual transmission and a planetary gear set in a neutral state according to an exemplary embodiment of the present invention.

<Description of Reference Numerals Indicating Primary Elements in the Drawings>

| | |
|---|---|
| 10: main shaft | 15: hub |
| 20: planetary gear set | 25: synchronizer cone |
| 30: synchronizer ring | 35: synchronizer sleeve |
| 40: first speed clutch gear | 45: reverse speed clutch gear |

DETAILED DESCRIPTION

In a preferred aspect, a manual transmission is provided that may include a transmission case; a main shaft; a hub coupled to the main shaft; a gear assembly disposed on one side of the hub and comprising a first speed clutch gear and a planetary gear set, the planetary gear set a pinion gear and a sun gear; a synchronizer sleeve; a synchronizer cone; and a synchronizer ring applying a frictional force to the synchronizer cone and synchronizing the gear assembly with the main shaft in a shifting process. Preferably the manual transmission comprises a reverse speed clutch gear that may be suitably formed on an exterior circumference of the sun gear. The manual transmission also may have the ring gear coupled to the first speed clutch gear, and the planetary carrier fixed to the transmission case.

In another preferred aspect, a manual transmission is provided that may include a main shaft; a gear assembly comprising a first speed clutch gear and a planetary gear set, the planetary gear set preferably comprising a pinion gear and a sun gear; a synchronizer sleeve; a synchronizer cone; and a synchronizer ring applying a frictional force to the synchronizer cone and synchronizing the gear assembly with the main shaft in a shifting process. Preferably the manual transmission comprises a reverse speed clutch gear that is associated with formed on sun gear. The manual transmission also may have the ring gear coupled to the first speed clutch gear.

An exemplary embodiment of the present invention will hereinafter be described in detail with reference to the accompanying drawings.

Figure 1B:
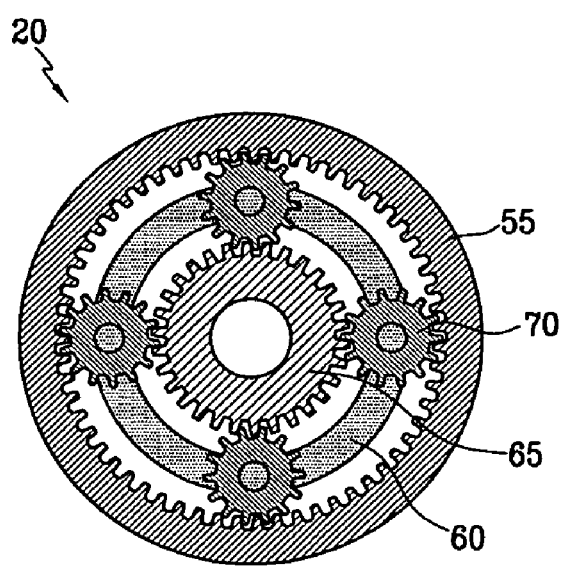
Figure 2A:
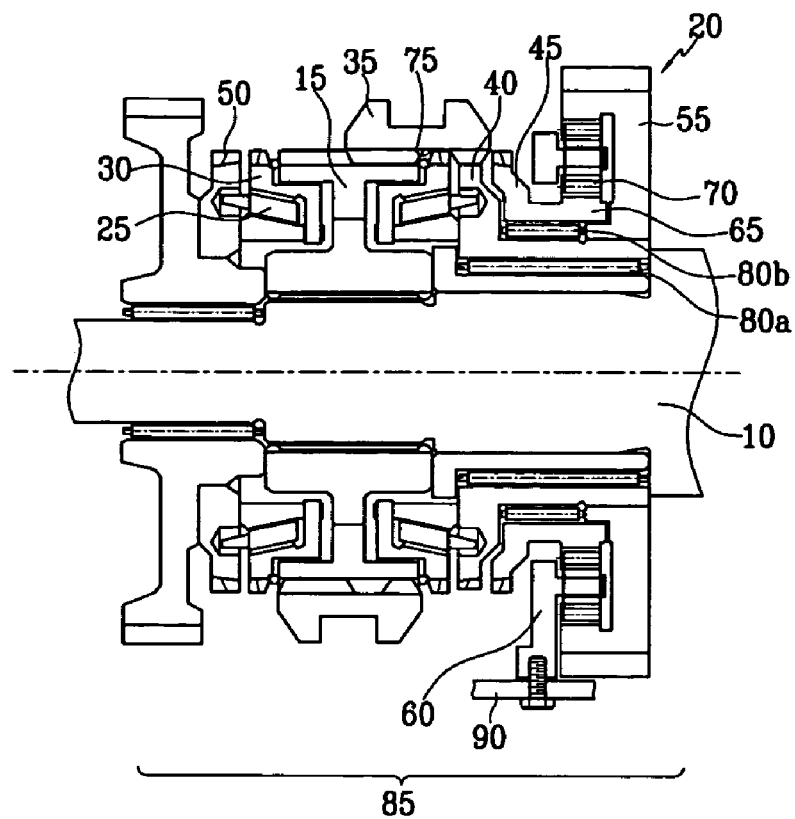
FIG. 2 is a cross-sectional view showing a part of the manual transmission and the planetary gear set in a first shift speed according to the exemplary embodiment of the present invention.
Figure 2B:
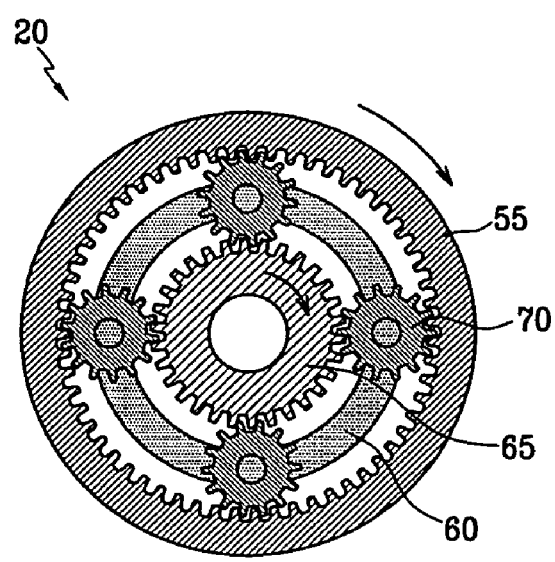
Figure 3A:
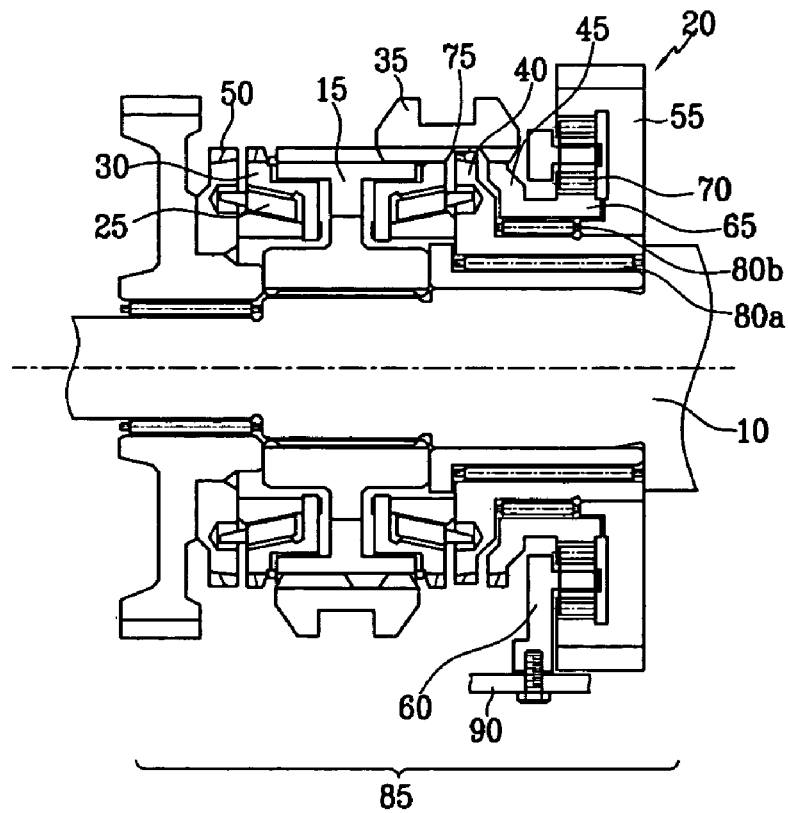
FIG. 3 is a cross-sectional view showing a part of the manual transmission and the planetary gear set in a reverse shift speed according to the exemplary embodiment of the present invention.
Figure 3B:
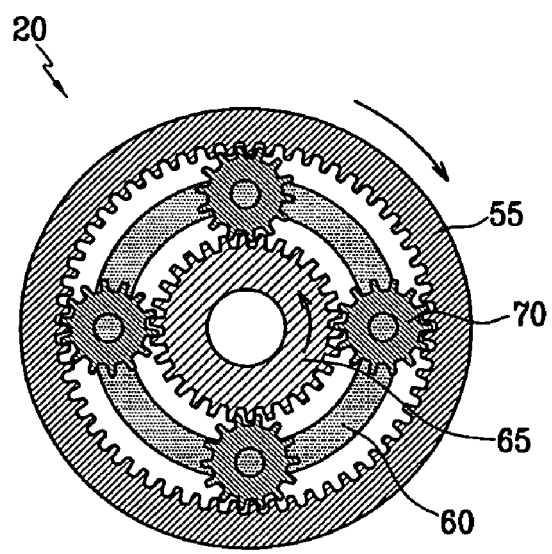

FIG. 1 is a cross-sectional view showing a part of a manual transmission and a planetary gear set in a neutral state, FIG. 2 is a cross-sectional view showing a part of the manual transmission and the planetary gear set in a first shift speed, and FIG. 3 is a cross-sectional view showing a part of the manual transmission and the planetary gear set in a reverse shift speed according to an exemplary embodiment of the present invention.

As shown in FIG. 1 to FIG. 3, the exemplary manual transmission according to the embodiment of the present invention suitably includes a main shaft 10, a hub 15, a gear assembly 85, a synchronizer sleeve 35, synchronizer cones 25, and synchronizer rings 30.

The main shaft 10 is connected to an engine (not shown), and receives power from the engine.

The hub 15 is suitably coupled to an exterior circumference of the main shaft 10.

The gear assembly 85 suitably includes a first speed clutch gear 40, a second speed clutch gear 50, and a planetary gear set 20.

The first speed clutch gear 40 may be suitably disposed on the right side of the hub 15, and the second speed clutch gear 50 may be disposed on the left side of the hub 15.

The first speed clutch gear 40 is suitably elongated in an opposite direction to the hub 15.

The planetary gear set 20 is preferably a single pinion planetary gear set, and may include a sun gear 65, a ring gear 55, a pinion gear 70, and a planetary carrier 60 rotatably supporting the pinion gear 70 that is meshed between the sun gear 65 and the ring gear 55.

The ring gear 55 is suitably elongated in the opposite direction to the hub 15. In addition, the elongated portion of the ring gear 55 is coupled to the elongated portion of the first speed clutch gear 40.

More precisely, the first speed clutch gear 40 is preferably splined to the ring gear 55.

In addition, a gear is preferably formed on an exterior circumference of the ring gear 55 and is engaged with a driven gear (not shown) of an output shaft (not shown). That is, in such a configuration the ring gear operates as an output member.

The planetary carrier 60 is suitably fixed to a transmission case 90.

The sun gear 65 is preferably elongated toward the hub 15, and the reverse speed clutch gear 45 is suitably formed on an exterior circumference of the elongated portion of the sun gear 65.

The reverse speed clutch gear 45 is suitably disposed on an exterior circumference of the elongated portion of the first speed clutch gear 40.

In addition, the reverse speed clutch gear 45 is suitably disposed between the first speed clutch gear 40 and the ring gear 55.

Meanwhile, needle rollers 80a and 80b are preferably interposed respectively between the main shaft 10 and the first speed clutch gear 40 and between the first speed clutch gear 40 and the reverse speed clutch gear 45.

The synchronizer sleeve 35 is preferably slidably connected to an exterior circumference of the hub 15, and slides in an axial direction of the main shaft 10. The synchronizer sleeve 35 selectively synchronizes the main shaft 10 with the first speed clutch gear 40, the second speed clutch gear 50, or the reverse speed clutch gear 45.

A groove 75 is preferably formed on an interior circumference of the synchronizer sleeve 35 so that the first speed clutch gear 40 is inserted therein and runs idle in a case that the synchronizer sleeve 35 synchronizes the main shaft 10 with the reverse speed clutch gear 45.

The synchronizer cones 25 preferably are fixed to the first and second speed clutch gears 40 and 50, and can synchronize a rotation speed of the main shaft 10 with a rotation speed of the first speed clutch gear 40 or the second speed clutch gear 50 in a case that the synchronizer sleeve 35 moves in the axial direction of the main shaft 10 and is engaged with the first speed clutch gear 40 or the second speed clutch gear 50.

The synchronizer rings 30 preferably apply a frictional force to the synchronizer cones 25 and synchronize the rotation speed of the main shaft 10 with the rotation speed of the first speed clutch gear 40 or the second speed clutch gear 50 in a case that the synchronizer sleeve 35 moves in the axial direction of the main shaft 10 and is engaged with the first speed clutch gear 40 or the second speed clutch gear 50.

Shifting processes from the neutral state to the first shift speed and from the first shift speed to the reverse shift speed according to the exemplary embodiment of the present invention will hereinafter be described in detail, referring to FIG. 1 to FIG. 3.

As shown in FIG. 1, the synchronizer sleeve 35 is not coupled to the gear assembly 85 and so a torque of the main shaft 10 is not applied to the gear assembly 85 in the neutral state. In addition, since the needle roller 80a is interposed between the main shaft 10 and the first speed clutch gear 40, the torque of the main shaft 10 is not applied to the first speed clutch gear 40.

As shown in FIG. 2, the synchronizer sleeve 35 is suitably engaged with the first speed clutch gear 40 and so the torque of the main shaft 10 is applied to the first speed clutch gear 40 in the first shift speed. In this case, the ring gear 55 splined to the first speed clutch gear 40 rotates in the same rotating direction as the first speed clutch gear 40. Therefore, the ring gear 55 applies the torque to the driven gear of the output shaft.

However, since the needle roller 80b is interposed between the reverse speed clutch gear 45 and the first speed clutch gear 40, the reverse speed clutch gear 45 runs idle.

As shown in FIG. 3, the synchronizer sleeve 35 is engaged with the reverse speed clutch gear 45 and so applies the torque of the main shaft 10 to the reverse speed clutch gear 45 in the reverse shift speed. In this case, the reverse speed clutch gear 45 applies the torque to the ring gear 55 via the pinion gear 70. At this time, the ring gear 55 rotates in an opposite rotating direction of the main shaft 10. In addition, the ring gear 55 applies the torque to the driven gear of the output shaft.

An exemplary shift lug structure of the manual transmission according to the embodiment of the present invention will hereinafter be described in detail with reference to the accompanying drawings.

Figure 4:
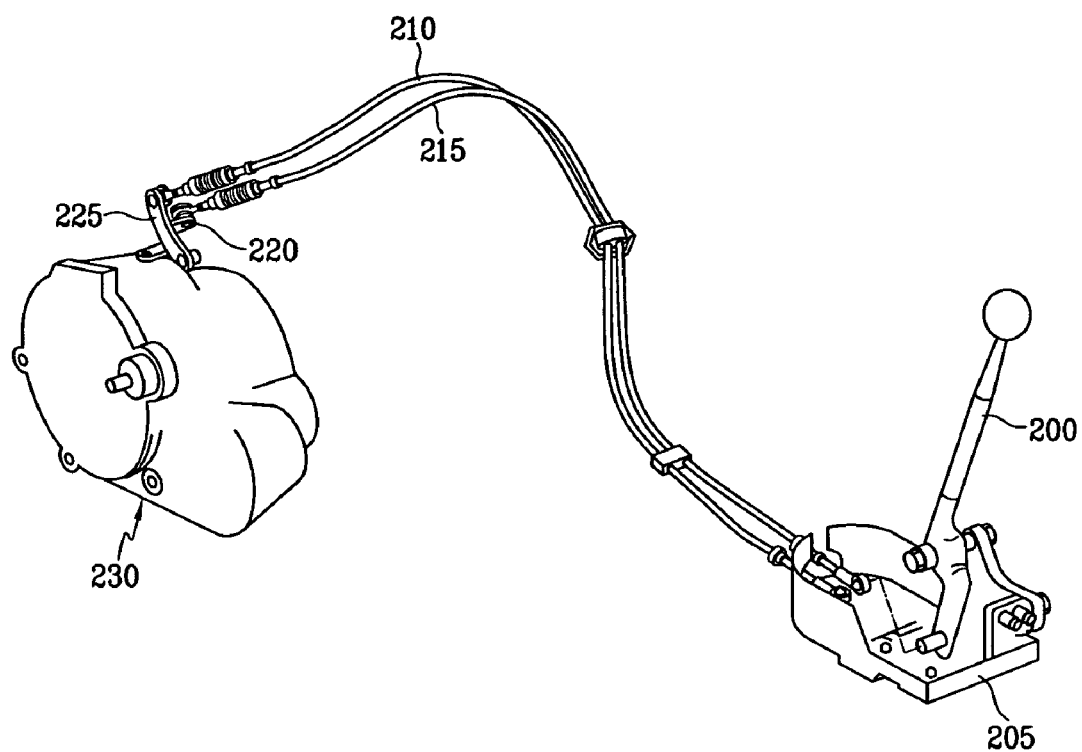
FIG. 4 is a perspective view showing the state that a shift lever is connected to a shifting control device via a shift cable according to the exemplary embodiment of the present invention.

FIG. 4 is a perspective view showing the state that a shift lever is connected to a shifting control device via a shift cable according to the exemplary embodiment of the present invention.

As shown in FIG. 4, a shift lever 200 is suitably mounted on a housing 205, and one end of each of a shift cable 210 and a select cable 215 is independently connected to a lower portion of the shift lever 200. In addition, the other end of each of the shift cable 210 and the select cable 215 is connected respectively to a shift control lever 225 and a select control lever 220 of a shifting control device 230.

Therefore, when a driver controls the shift lever 200, the shift control lever 225 and the select control lever 220 are controlled by the shift lever 200 via the shift cable 210 and the select cable 215. Finally, the shift control lever 225 and the select control lever 220 are moved and connected to a specified gear train of a plurality of gear trains in the manual transmission. Thus, the desired shift speed is selected.

Figure 5:
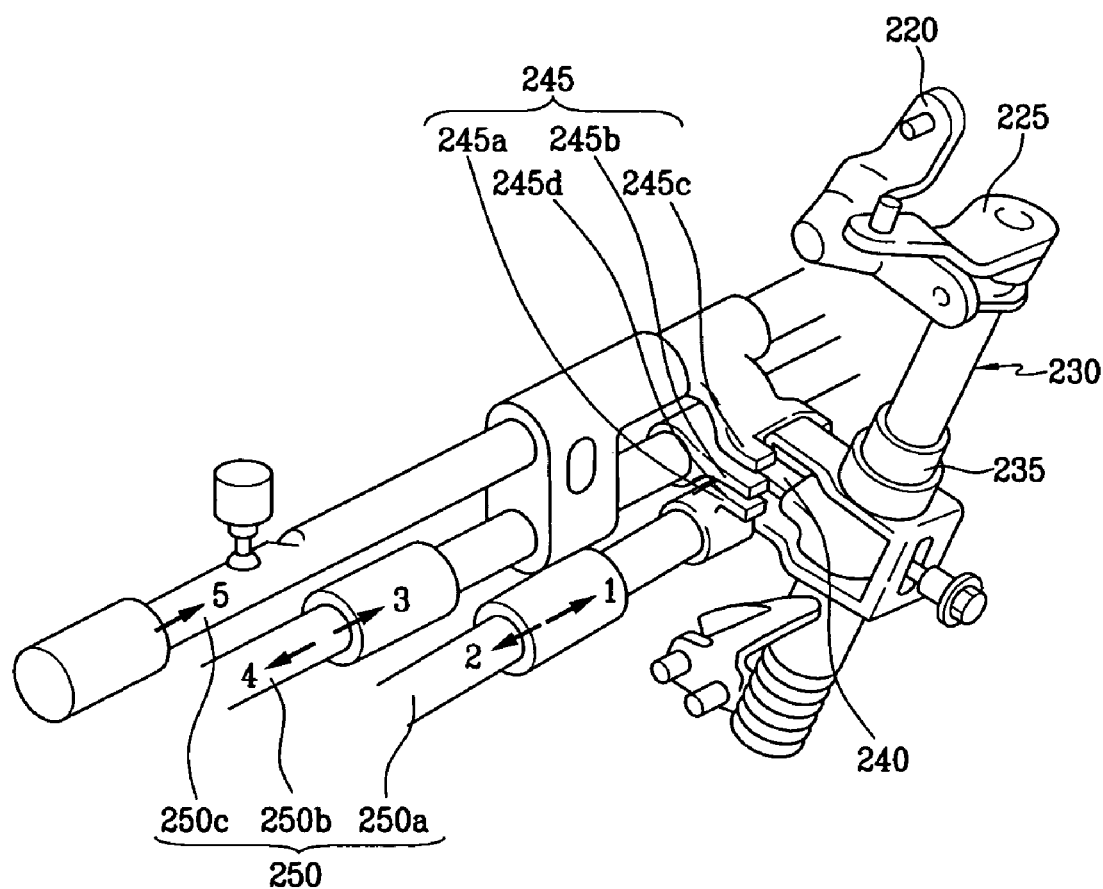
FIG. 5 is a perspective view of the shifting control device in the manual transmission according to the exemplary embodiment of the present invention.
Figure 6:
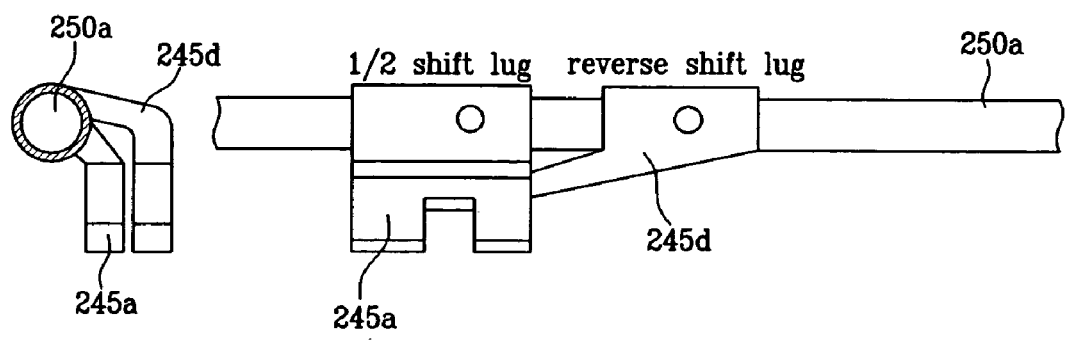
FIG. 6 is a schematic diagram showing the state that a 1-2 shift lug and a reverse shift lug are disposed on a 1-2 shift rail according to the exemplary embodiment of the present invention.

FIG. 5 is a perspective view of the shifting control device in the manual transmission and FIG. 6 is a schematic diagram showing the state that a 1-2 shift lug and a reverse shift lug are disposed on a 1-2 shift rail according to the exemplary embodiment of the present invention.

As shown in FIG. 5 and FIG. 6, the shifting, control device 230 suitably includes a control shaft 235, a shift rail 250, a shift lug 245, and a shift finger 240.

The control shaft 235 is connected to the shift lever 200 via the shift cable 210 and the select cable 215. The shift control lever 225 and the select control lever 220 are disposed on the control shaft 235.

The shift rail 250 suitably includes a 1-2 shift rail 250a, a 3-4 shift rail 250b, and a 5-6 shift rail 250c.

The shift lug 245 suitably includes a 1-2 shift lug 245a, a 3-4 shift lug 245b, a 5-6 shift lug 245c, and a reverse shift lug 245d.

The shift lug 245 is suitably disposed on the shift rail 250. That is, the 1-2 shift lug 245a is disposed on the 1-2 shift rail 250a, the 3-4 shift lug 245b is disposed on the 3-4 shift rail 250b, and the 5-6 shift lug 245c is disposed on the 5-6 shift rail 250c. In addition, the reverse shift lug 245d is disposed on the 1-2 shift rail 250a.

Meanwhile, the reverse shift lug 245d is suitably connected to the 1-2 shift lug 245a.

The shift finger 240 is suitably disposed on the control shaft 235, and the shift finger 240 is suitably selectively coupled to one of the shift lugs 245a, 245b, and 245c. Therefore, the shift finger 240 controls the shift lug 245 according to rotation and movement of the control shaft 235. The shift finger 240 is located among the 1-2 shift lug 245a, the 3-4 shift lug 245b, and the 5-6 shift lug 245c.

In addition, the shift finger 240 is suitably located in one of the shift lugs 245a, 245b, and 245c disposed respectively on the shift rails 250a, 250b, and 250c by upward or downward movement of the control shaft 235 that is controlled by the shift lever 200. Therefore, the shift finger 240 pushes one of the shift lugs 245a, 245b, and 245c by the operation of the shift lever 200, and a shift fork coupled to the shift lug 245 moves the synchronizer sleeve 35. In this way, the shifting can be accomplished.

Figure 7:
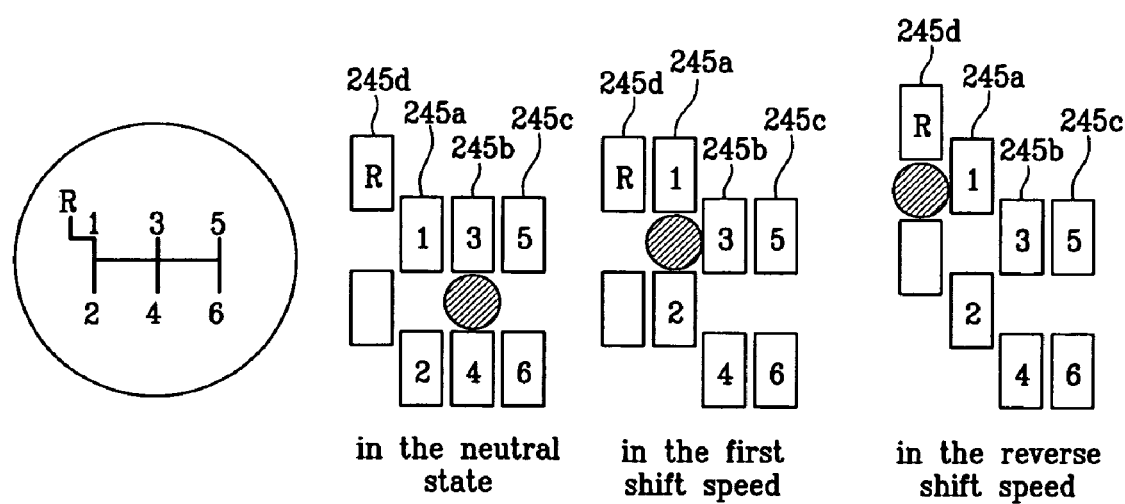
FIG. 7 is a schematic diagram showing a shifting lever and shift lug positions in the neutral state, in the first shift speed, and in the reverse shift speed.
Figure 8:
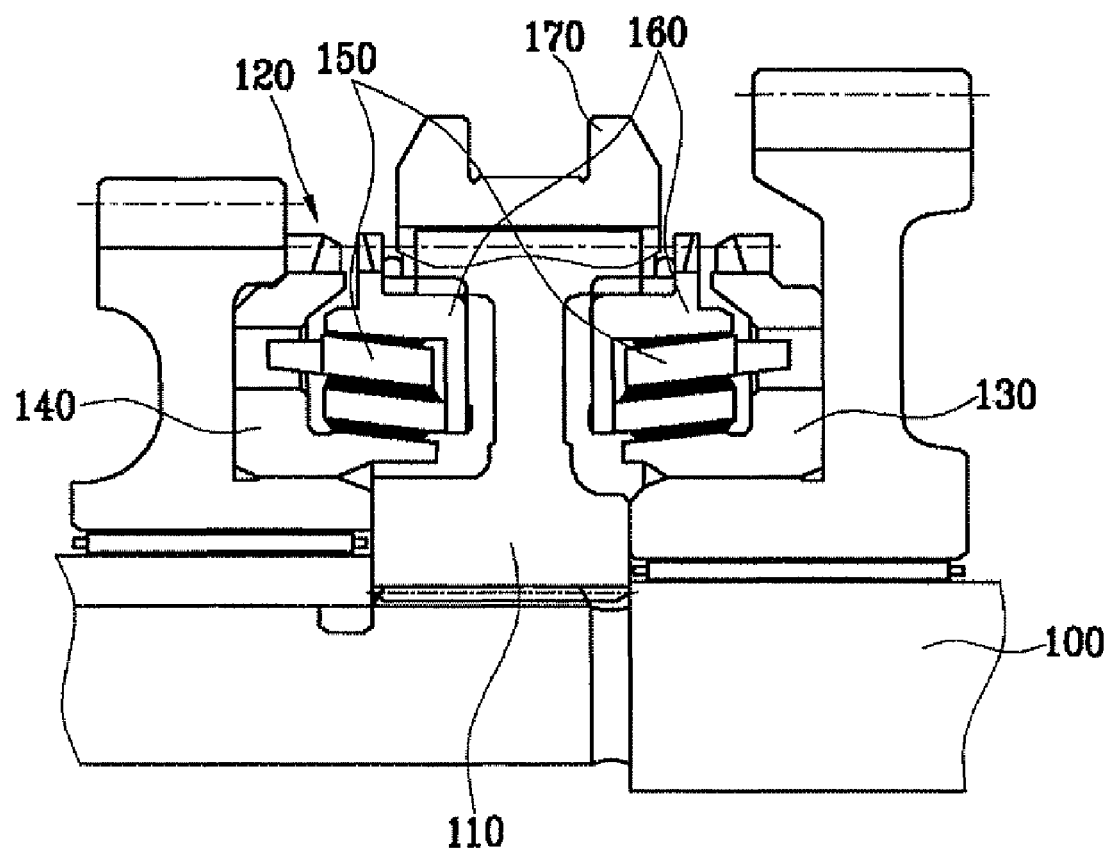
FIG. 8 is a cross-sectional view showing a part of a conventional manual transmission.
Figure 9:
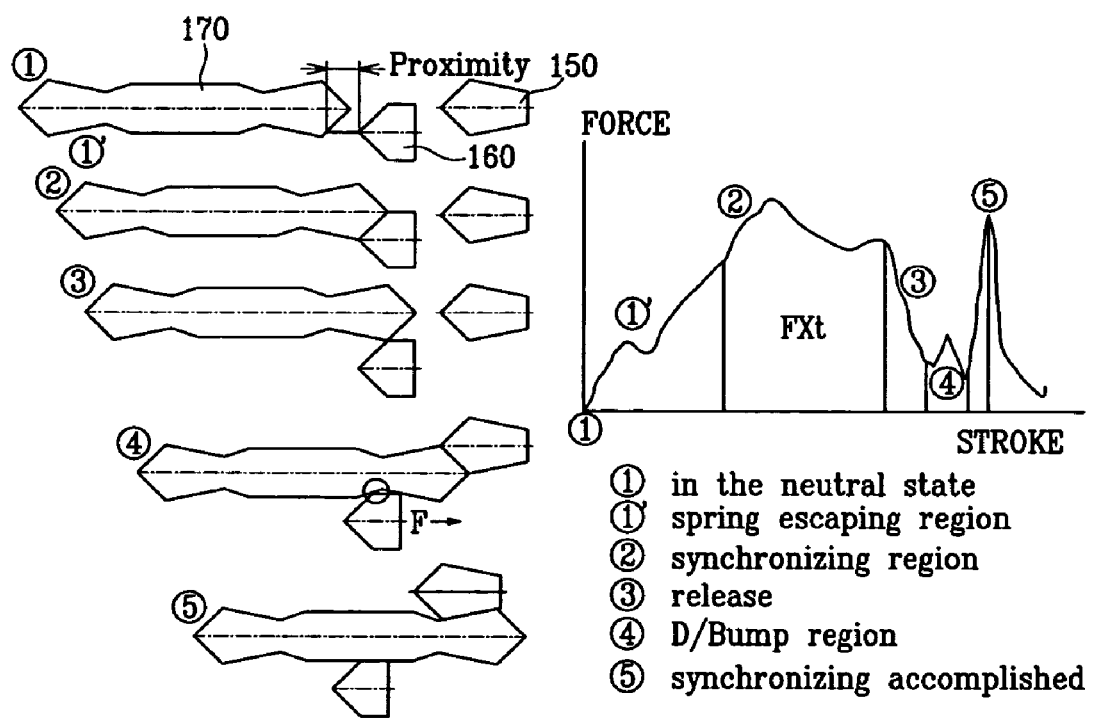
FIG. 9 is a schematic diagram showing a shifting process and a graph showing a force applied to a synchronizer sleeve with respect to a stroke of the synchronizer sleeve according to the conventional manual transmission.

FIG. 7 is a schematic diagram showing the shifting lever and shift lug positions in the neutral state, in the first shift speed, and in the reverse shift speed.

As shown in FIG. 7, the reverse shift lug 245d is suitably disposed on the left of the 1-2 shift lug 245a according to the embodiment of the present invention.

If the shift lever 200 is moved more to the left after the shift lever 200 in the neutral position is moved to the first speed position, the shift finger 240 pushes the reverse shift lug 245d.

Thus, direct shifting from the first shift speed to the reverse shift speed and from the reverse shift speed to the first shift speed can be possible.

As described above, the manual transmission may be compactly designed and the length of the transmission may be reduced by an effective arrangement of the reverse speed clutch gear according to the present invention.

In addition, the shift feel and usage convenience may be improved by enabling direct shifting from the first shift speed to the reverse shift speed.

In addition, the first speed clutch gear may prevent or reduce the reverse noise. Thus, the components of the transmission may be simplified and so production cost may be reduced.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A manual transmission comprising:
    a transmission case;
    a main shaft;
    a hub coupled to an exterior circumference of the main shaft;
    a gear assembly disposed on one side of the hub and comprising a first speed clutch gear and a planetary gear set, the planetary gear set comprising a ring gear, a pinion gear, a sun gear, and a planetary carrier rotatably supporting the pinion gear;
    a synchronizer sleeve slidably connected to an exterior circumference of the hub and sliding in an axial direction of the main shaft, the synchronizer sleeve connecting the main shaft with the gear assembly;
    a synchronizer cone fixed to the first speed clutch gear; and
    a synchronizer ring applying a frictional force to the synchronizer cone and synchronizing the gear assembly with the main shaft in a shifting process,
    wherein the ring gear is coupled to the first speed clutch gear, the planetary carrier is fixed to the transmission case, and a reverse speed clutch gear is formed on an exterior circumference of the sun gear.

2. The manual transmission of claim 1, wherein the first speed clutch gear and the ring gear are respectively elongated in an opposite direction to the hub and the elongated portions of the first speed clutch gear and the ring gear are coupled to each other.

3. The manual transmission of claim 2, wherein the first speed clutch gear is splined to the ring gear.

4. The manual transmission of claim 2, wherein the sun gear is elongated toward the hub and the reverse speed clutch gear is formed on an exterior circumference of the elongated portion of the sun gear.

5. The manual transmission of claim 4, wherein a groove is formed on an interior circumference of the synchronizer sleeve so that the first speed clutch gear is inserted therein and runs idle in a case that the synchronizer sleeve synchronizes the main shaft with the reverse speed clutch gear.

6. The manual transmission of claim 5, wherein a gear is formed on an exterior circumference of the ring gear and the ring gear operates as an output member.

7. The manual transmission of claim 6, wherein the reverse speed clutch gear is disposed on an exterior circumference of the elongated portion of the first shift clutch gear.

8. The manual transmission of claim 6, wherein the reverse speed clutch gear is disposed between the first speed clutch gear and the ring gear.

9. The manual transmission of claim 6, wherein needle rollers are interposed between the main shaft and the first speed clutch gear and between the first speed clutch gear and the reverse speed clutch gear.

10. A motor vehicle comprising a manual transmission of claim 1.

11. A manual transmission comprising:
    a transmission case;
    a main shaft;
    a hub coupled to the main shaft;
    a gear assembly disposed on one side of the hub and comprising a first speed clutch gear and a planetary gear set, the planetary gear set comprising a pinion gear and a sun gear;
    a synchronizer sleeve;
    a synchronizer cone; and
    a synchronizer ring applying a frictional force to the synchronizer cone and synchronizing the gear assembly with the main shaft in a shifting process,
    wherein a reverse speed clutch gear is formed on an exterior circumference of the sun gear.

12. The manual transmission of claim 11 wherein a ring gear is coupled to the first speed clutch gear, and a planetary carrier is fixed to the transmission case.

13. A motor vehicle comprising a manual transmission of claim 11.

* * * * *